(12) United States Patent
Yamaguchi et al.

(10) Patent No.: US 8,505,381 B2
(45) Date of Patent: Aug. 13, 2013

(54) CAPACITIVE ACCELERATION SENSOR

(75) Inventors: Yasuo Yamaguchi, Tokyo (JP); Makio Horikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 207 days.

(21) Appl. No.: 12/758,342

(22) Filed: Apr. 12, 2010

(65) Prior Publication Data
US 2011/0011182 A1   Jan. 20, 2011

(30) Foreign Application Priority Data

Jul. 16, 2009   (JP) ................... 2009-167637

(51) Int. Cl.
   *G01P 15/125* (2006.01)
(52) U.S. Cl.
   USPC .................. 73/514.32; 73/514.38
(58) Field of Classification Search
   USPC ............ 73/514.32, 514.36, 514.38, 514.29, 73/493, 431
   See application file for complete search history.

(56) References Cited

U.S. PATENT DOCUMENTS

| | | | |
|---|---|---|---|
| 5,487,305 A * | 1/1996 | Ristic et al. | 73/514.32 |
| 5,646,347 A * | 7/1997 | Weiblen et al. | 73/514.32 |
| 6,502,462 B2 * | 1/2003 | Sakai | 73/514.32 |
| 7,814,794 B2 * | 10/2010 | Wang | 73/514.32 |
| 7,934,423 B2 * | 5/2011 | Nasiri et al. | 73/514.02 |
| 8,047,075 B2 * | 11/2011 | Nasiri et al. | 73/514.32 |

FOREIGN PATENT DOCUMENTS

| | | |
|---|---|---|
| CN | 1820191 A | 8/2006 |
| JP | 4-249726 | 9/1992 |
| JP | 6-258341 | 9/1994 |
| JP | 7-325106 | 12/1995 |
| JP | 8-304450 | 11/1996 |
| JP | 2000-22170 | 1/2000 |
| JP | 2007-17284 | 1/2007 |
| JP | 2007-530914 | 11/2007 |

OTHER PUBLICATIONS

Office Action issued Oct. 19, 2011in Korean Patent Application No. 10-2010-0066106 (English translation only).
Chinese Office Action issued Nov. 30, 2011 in patent application No. 201010228930.4 with English translation.
Office Action issued Sep. 4, 2012 in Japanese Application No. 2009-167637 (With English Translation).
Chinese Office Action issued Jan. 7, 2013 in Patent Application No. 201010228930.4 with Partial English Translation.
Office Action issued May 14, 2012 in Chinese Application No. 201010228930.4 (With English Translation).
Office Action issued May 28, 2013 in Japanese Patent Application No. 2009-167637 w/partial English translation.

* cited by examiner

*Primary Examiner* — Helen Kwok
(74) *Attorney, Agent, or Firm* — Oblon, Spivak, McClelland, Maier & Neustadt, L.L.P.

(57) ABSTRACT

A capacitive acceleration sensor includes an acceleration sensor moving part and an acceleration sensor stationary part together forming a capacitor for detecting acceleration, a sealing structure hermetically enclosing but not contacting the acceleration sensor moving part, and at least one support pillar enclosed by but not directly contacted by the acceleration sensor moving part, both ends of the at least one support pillar being in contact with inside walls of the sealing structure. The acceleration sensor moving part is electrically connected to the at least one support pillar.

3 Claims, 4 Drawing Sheets

CAPACITIVE ACCELERATION SENSOR

BACKGROUND OF THE INVENTION

1. Field of the Invention

The present invention relates to a capacitive acceleration sensor in which the moving part for detecting acceleration changes is disposed in a hermetically sealed air gap.

2. Background Art

Capacitive acceleration sensors measure acceleration by detecting a change in the capacitance of a capacitor. This capacitor includes a moving part (sometimes referred to as a "mass body") and a stationary part. In the typical construction of a capacitive acceleration sensor, the moving part is supported by a beam so that the part is slightly displaced by acceleration and the resulting change in the capacitance of the capacitor is used to detect the acceleration.

This moving part is hermetically enclosed in an air gap formed by a sealing structure so that the part is movable through a certain range of movement. Because of its being hermetically enclosed, the moving part is protected from foreign objects and moisture. The sealing structure is often made up of an upper glass and a lower glass between which is vertically sandwiched the silicon including the moving part and the stationary part. The sealing structure is desired to have an air gap for accommodating the moving part and to prevent the moving part from being affected by foreign objects and moisture.

It is common that the sealing structure is sealed with a resin into a package by transfer molding in order to achieve smaller size, lower cost, and higher performance. In transfer molding, a molding resin is injected at high pressure by the injection molding machine. Therefore, when a capacitive acceleration sensor is subjected to injection molding, a high pressure is applied to the sensor. This high pressure has been found to break the sealing structure at the portion forming the air gap. Such breaking of the sealing structure has resulted in breakage of the moving part and stationary part for detecting acceleration and also resulted in a foreign object entering into the air gap, causing a variation in the characteristics of the acceleration sensor.

In order to avoid breaking of the sealing structure, the injection molding pressure may be reduced. It has been found, however, that such reduction in the injection molding pressure slows down the flow of molding resin and causes formation of voids in the molding resin, thus degrading the internal portion-protecting capability and hence reliability of the sealing structure. Degradation of the reliability has also resulted from detachment of the capacitive acceleration sensor from the molding resin due to reduced adhesion between them.

Another way to avoid breaking of the sealing structure may be to dispose a support pillar in the air gap formed by the sealing structure. Specifically, the support pillar may be disposed so that the top and bottom of the air gap are respectively supported on the opposite ends of the support pillar in order to prevent breaking of the sealing structure. It has been found, however, that if the support pillar is set in an electrically floating state, the moving part is displaced by the electrical action of the support pillar, thereby lowering the measuring accuracy of the acceleration sensor.

SUMMARY OF THE INVENTION

The present invention has been made to solve the above problems. It is, therefore, an object of the present invention to provide a capacitive acceleration sensor constructed so as to prevent breaking of its sealing structure when the structure is sealed by transfer molding and also prevent degradation of the acceleration measuring accuracy of the sensor.

According to one aspect of the present invention, a capacitive acceleration sensor includes an acceleration sensor moving part and an acceleration sensor stationary part together forming a capacitor for detecting acceleration, a sealing structure hermetically enclosing but not contacting the acceleration sensor moving part, and at least one support pillar enclosed by but not directly contacted by the acceleration sensor moving part, both ends of the at least one support pillar being in contact with inside walls of the sealing structure. The acceleration sensor moving part is electrically connected to the at least one support pillar.

According to another aspect of the present invention, a capacitive acceleration sensor includes an acceleration sensor moving part and an acceleration sensor stationary part together forming a capacitor for detecting acceleration, a sealing structure hermetically enclosing but not contacting the acceleration sensor moving part. The portions of the acceleration sensor moving part and the acceleration sensor stationary part that form the capacitor have a comb teeth shape. The comb-teeth-shaped portion of the acceleration sensor stationary part includes at least one support pillar for the sealing structure. The at least one support pillar is enclosed by but not directly contacted by the acceleration sensor moving part, and both ends of the at least one support pillar are in contact with inside walls of the sealing structure.

Other and further objects, features and advantages of the invention will appear more fully from the following description.

DETAILED DESCRIPTION OF THE PREFERRED EMBODIMENTS

First Embodiment

A first embodiment of the present invention will be described with reference to FIGS. 1 to 3. It should be noted that throughout the description of the first embodiment, like numerals represent like materials or like or corresponding components, and these materials and components may be described only once. This also applies to other embodiments of the invention subsequently described.

Figure 1:
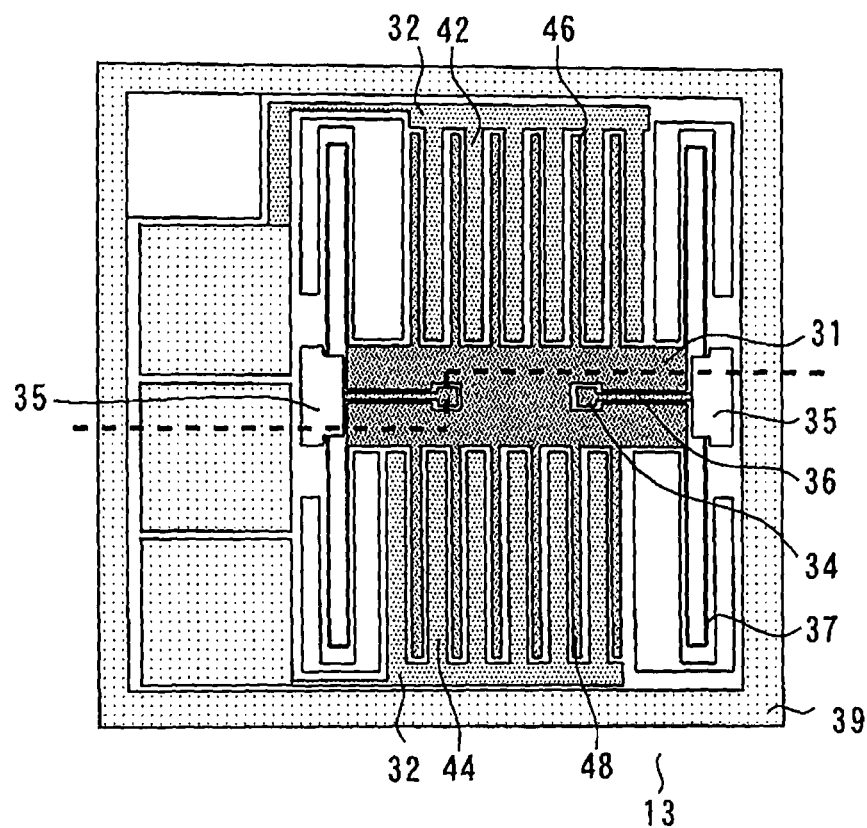
FIG. 1 is a plan view illustrating a semiconductor portion of the first embodiment.

FIG. 1 is a plan view illustrating a semiconductor portion 13 of the present embodiment. This semiconductor portion 13 is adapted to detect acceleration. The semiconductor portion 13 includes an acceleration sensor moving part 31 (hereinafter referred to as the "moving part 31") and an acceleration sensor stationary part 32 (hereinafter referred to as the "stationary part 32"). The moving part 31 includes moving comb teeth portions 46 and 48 formed to have a comb teeth shape, and the stationary part 32 includes stationary comb teeth portions 42 and 44 also formed to have a comb teeth shape. The moving comb teeth portion 46 is interdigitated with the stationary comb teeth portion 42 to form a capacitor. Likewise, the moving comb teeth portion 48 is interdigitated with the stationary comb teeth portion 44 to form a capacitor.

The moving part 31 is coupled to anchors 35 through beams 37. The moving part 31 supported by the beams 37 is displaced by acceleration, resulting in a change in the capacitances of the above capacitors. Support pillars 34 are disposed such that they are enclosed by but not contacted by the moving part 31. The function of the support pillars 34 will be described later. Each support pillar 34 is coupled to an anchor 35 through a conductive connection portion 36.

Figure 2:
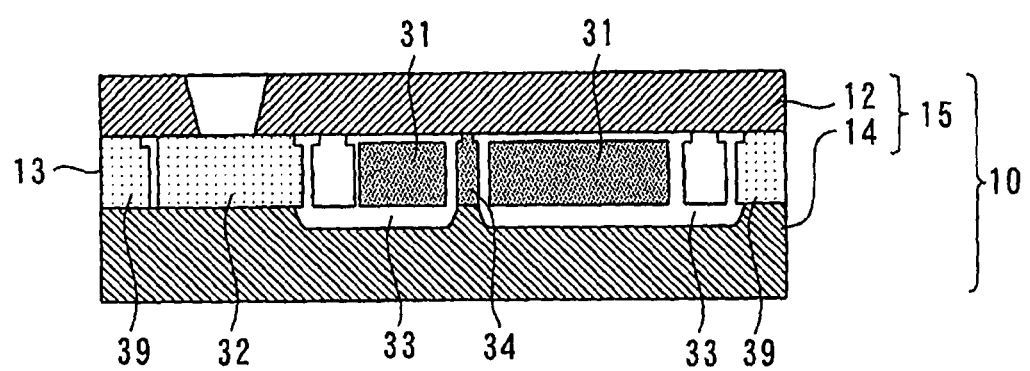
FIG. 2 is a cross-sectional view corresponding to that taken along broken lines of FIG. 1, illustrating a capacitive acceleration sensor having a sealing structure.

FIG. 2 is a cross-sectional view corresponding to that taken along broken lines of FIG. 1, illustrating a capacitive acceleration sensor 10 having a sealing structure 15. The sealing structure 15 includes an upper glass 12 and a lower glass 14 between which the semiconductor portion 13 is sandwiched to hermetically enclose the moving part 31. Specifically, the upper glass 12 and the lower glass 14 are in contact, respectively, with the opposite ends of the support pillars 34. Further, the upper and lower glasses 12 and 14 are in contact with a coupling frame 39. These glasses are also in contact with the stationary part 32. It should be noted that the anchors are in contact with either the upper glass 12 or the lower glass 14, or both. As a result, an air gap 33 is formed as shown in FIG. 2.

The moving part 31 is mounted in the air gap 33 so that the part is not in contact with the sealing structure 15 including the upper glass 12 and the lower glass 14. In this way, the moving part 31 is movable through a certain range of movement. Further, the moving part 31 is hermetically enclosed.

The support pillars 34 are enclosed by the moving part 31, but are not in contact with the moving part 31, as described above. Further, the opposite ends of the support pillars 34 are in contact, respectively, with the upper glass 12 and the lower glass 14. As a result, the air gap 33 around the moving part 31 is large, since the moving part 31 is not in contact with the sealing structure 15. Further, in this construction, the support pillars 34 support the top and bottom of this large air gap 33. This completes the description of the configuration of the capacitive acceleration sensor of the present embodiment.

With the construction of the present embodiment, it is possible to prevent breaking of the upper glass 12 and the lower glass 14 when a high pressure is applied to these glasses in a transfer molding process, which is widely used to seal a capacitive acceleration sensor into a package. That is, both ends of the support pillars 34 of the present embodiment support inside walls of the air gap 33, and in this way the support pillars 34 increase the strength of the sealing structure 15. As a result, breaking of the upper glass 12 and the lower glass 14 can be prevented without reducing the injection molding pressure in the transfer molding process. Further, the air gap 33 can be maintained airtight, thereby protecting the moving part 31 and preventing foreign objects from entering the air gap. That is, the sealing structure 15 can protect the semiconductor portion 31. Further, the injection molding can be performed at the desired pressure, resulting in the manufacture of a highly reliable package. It will be noted that the above construction of the present embodiment can prevent breaking of the upper and lower glasses 12 and 14 due to the application of external forces, as well as due to the pressure in the transfer molding process.

Further, the support pillars 34 are coupled to the anchors 35 through the connection portions 36, and the moving part 31 is also coupled to the anchors 35 through the beams 37. Therefore, the support pillars 34 and the moving part 31 are at the same potential. This means that the support pillars 34 do not electrically affect the moving part 31, thus preventing degradation of the function and accuracy of the acceleration sensor due to the use of the support pillars 34. For example, if the support pillars 34 are in an electrically floating state, there may be a potential difference or a change in the potential difference between the moving part and the support pillars, which may affect the function and accuracy of the acceleration sensor. Particularly, if the moving part 31 is displaced by electrical action, not by acceleration, then degradation of the accuracy of the acceleration sensor will result. On the other hand, in the construction of the present embodiment, the support pillars 34 and the moving part 31 are at the same potential although the support pillars 34 are surrounded by and adjacent to the moving part 31, thus avoiding the above problem.

Although in the present embodiment the sealing structure 15 is made up of the upper glass 12 and the lower glass 14, it is to be understood that the present invention is not limited to this particular structure. For example, the sealing structure 15 may be made of silicon. This allows the structure 15 to be formed by an ordinary semiconductor manufacturing line, which is advantageous in reducing manufacturing cost, etc. On the other hand, formation of a sealing structure using glass requires a special manufacturing line and special equipment, since the glass contains impurities. Further, the sealing structure may have any shape that allows an air gap to be formed by the structure alone or in combination with part of the semiconductor portion.

Figure 3:
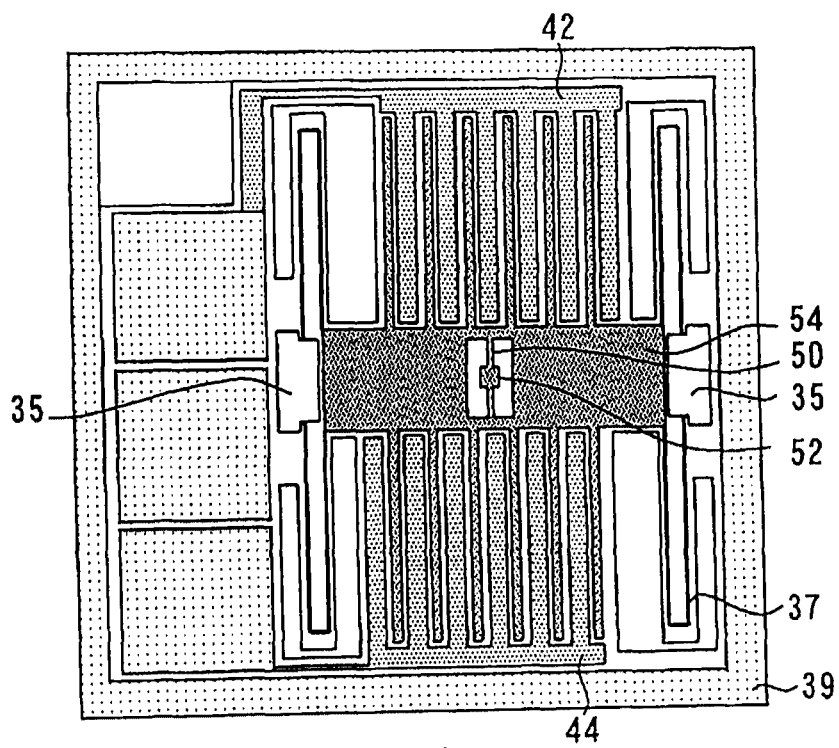
FIG. 3 is a plan view illustrating a semiconductor portion according to a variation of the first embodiment.

FIG. 3 is a plan view illustrating a semiconductor portion according to a variation of the present embodiment. This semiconductor portion shown in FIG. 3 differs in configuration from that shown in FIG. 1 in that a support pillar 52 is coupled to a moving part 54 through connection portions 50. This configuration is advantageous in that, although it is simpler than the configuration of FIG. 1, it can produce the same effect.

Second Embodiment

Figure 4:
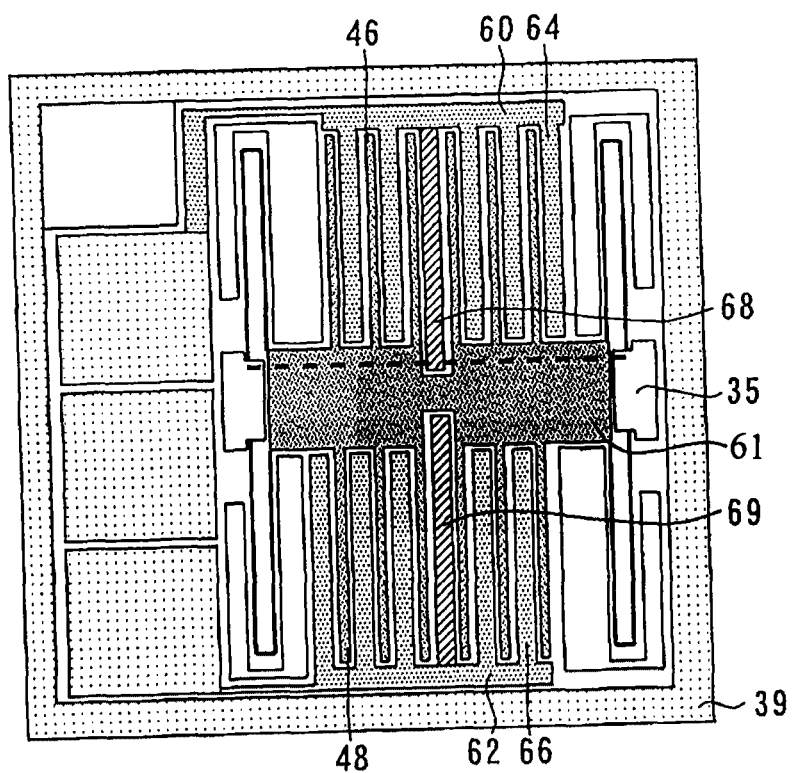
FIG. 4 is a plan view of a semiconductor portion of the second embodiment.

A second embodiment of the present invention will be described with reference to FIGS. 4 to 7. FIG. 4 is a plan view of a semiconductor portion of the second embodiment. A stationary comb teeth portion 64 and a moving comb teeth portion 46 together form a capacitor, and a stationary comb teeth portion 66 and a moving comb teeth portion 48 together form a capacitor. The stationary comb teeth portion 64 includes a comb tooth 68 having a support pillar. Likewise, the stationary comb teeth portion 66 includes a comb tooth 69 having a support pillar.

Figure 5:
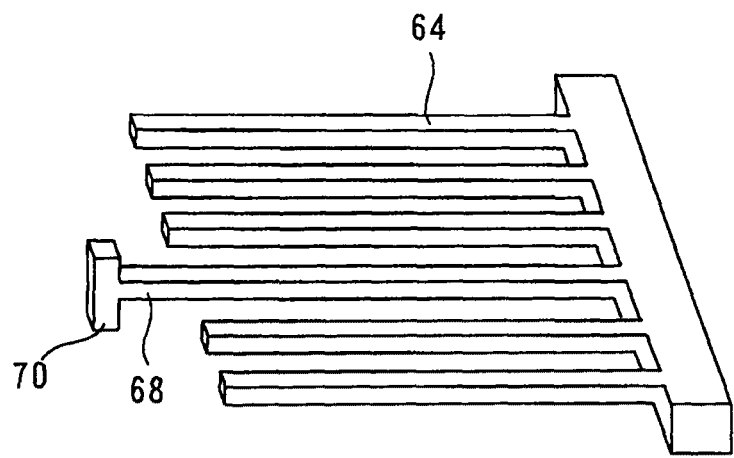
FIG. 5 is a perspective view of the stationary comb teeth portion.

FIG. 5 is a perspective view of the stationary comb teeth portion 64. The comb tooth 68 of the stationary comb teeth portion 64 extends further than the other comb teeth and has a support pillar 70 at its tip, as shown in FIG. 5. The function of this support pillar 70 is the same as that of the support pillars 34 described in connection with the first embodiment. The comb tooth 69 with a support pillar shown in FIG. 4 has the same configuration as the comb tooth 68.

Figure 6:
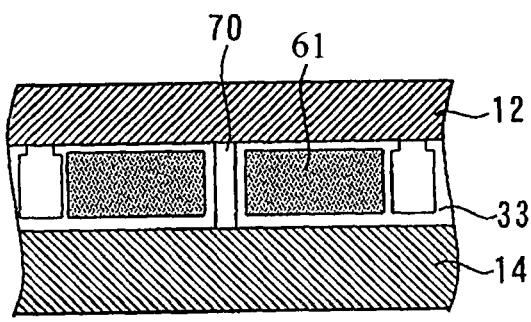
FIG. 6 is a cross-sectional view corresponding to that taken along the broken line of FIG. 4, illustrating a capacitive acceleration sensor having an upper glass and a lower glass such as those described in connection with the first embodiment.

FIG. 6 is a cross-sectional view corresponding to that taken along the broken line of FIG. 4, illustrating a capacitive acceleration sensor having an upper glass 12 and a lower glass 14 such as those described in connection with the first embodiment. Both ends of the support pillar 70 are in contact with inside walls of the sealing structure made up of the upper and lower glasses 12 and 14, as can be seen from FIG. 6. Furthermore, both ends of the support pillar of the comb tooth 69 are also contact with inside walls of the sealing structure.

Thus, the capacitive acceleration sensor of the second embodiment is characterized in that two comb teeth have support pillars that serve to increase the strength of the sealing structure. That is, portions of the two comb teeth are support pillars for the sealing structure, and the use of such support pillars simplifies the construction of the capacitive acceleration sensor while retaining the advantages described in connection with the first embodiment. It should will be noted that like the first embodiment, the support pillars of the present embodiment are enclosed by but not contacted by the moving part 61.

Figure 7:
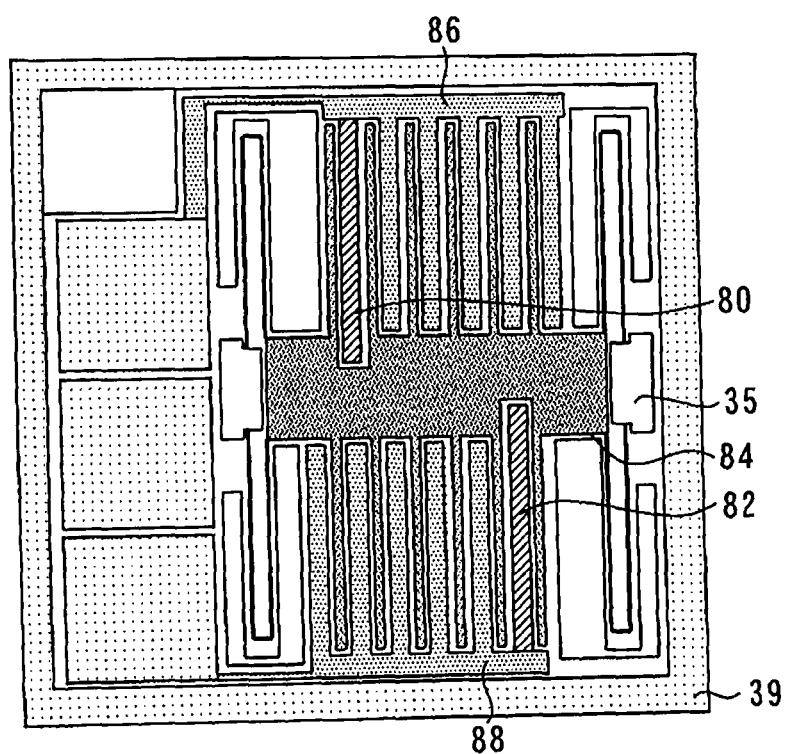
FIG. 7 is a plan view illustrating a variation of the capacitive acceleration sensor (or semiconductor portion) of the second embodiment.

FIG. 7 is a plan view illustrating a variation of the capacitive acceleration sensor (or semiconductor portion) of the present embodiment. The configuration shown in FIG. 7 is characterized in that support pillars are disposed so as to divide the length of a moving part 84 in the longitudinal direction into three substantially equal portions. More specifically, the support pillar of a comb tooth 80 and that of a comb tooth 82 are arranged and spaced so as to divide the length of the moving part 84 in the longitudinal direction into three substantially equal portions. In the example shown in FIG. 4 described above, on the other hand, the support pillars are disposed at the center of the length of the moving part. However, breaking of the sealing structure can be more effectively prevented by distributing the support pillars, as in the configuration of FIG. 7. It will be noted that the number of support pillars is determined based on the set injection molding pressure in the transfer molding process. Therefore, the number of support pillars may be increased, and these support pillars may be disposed so as to divide the length of the moving part in the longitudinal direction into four or five substantially equal portions. Further, various other alterations may be made to the present embodiment without departing from the scope of the present invention. It should be noted that the present embodiment is susceptible of at least alterations which are the same as or correspond to those that can be made to the first embodiment.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2009-167637, filed on Jul. 16, 2009 including specification, claims, drawings and summary, on which the Convention priority of the present application is based, are incorporated herein by reference in its entirety.

What is claimed is:

1. A capacitive acceleration sensor comprising:
  an acceleration sensor moving part coupled to an anchor which is external to the acceleration sensor moving part;
  an acceleration sensor stationary part which, together with the acceleration sensor moving part, forms a capacitor for detecting acceleration;
  a sealing structure hermetically enclosing but not contacting said acceleration sensor moving part; and
  at least one support pillar enclosed by but not directly contacted by said acceleration sensor moving part, both ends of said at least one support pillar being in contact with inside walls of said sealing structure;
  wherein said acceleration sensor moving part is electrically connected to said at least one support pillar when an acceleration is applied to the acceleration sensor and when no acceleration is applied to the acceleration sensor.

2. The capacitive acceleration sensor according to claim 1, wherein said at least one support pillar is disposed at two locations so as to divide a length of said acceleration sensor moving part in a longitudinal direction into three equal portions.

3. The capacitive acceleration sensor according to claim 1, wherein said sealing structure is silicon.

* * * * *